United States Patent [19]

Sharpless

[11] Patent Number: 4,615,649
[45] Date of Patent: Oct. 7, 1986

[54] POWDER PUMP HAVING SUCTION TUBE DEFLECTOR

[75] Inventor: John Sharpless, Oberlin, Ohio

[73] Assignee: Nordson Corporation, Amherst, Ohio

[21] Appl. No.: 668,022

[22] Filed: Nov. 5, 1984

Related U.S. Application Data

[63] Continuation-in-part of Ser. No. 660,388, Oct. 12, 1984, abandoned.

[51] Int. Cl.$^4$ ............................................. B65G 53/40
[52] U.S. Cl. .................................. 406/138; 406/142; 406/152
[58] Field of Search .................... 406/92–95, 406/114, 127, 141–144, 151–153, 138, 192

[56] References Cited

U.S. PATENT DOCUMENTS

| | | | |
|---|---|---|---|
| 2,794,686 | 6/1957 | Anselman et al. | 406/95 |
| 3,345,111 | 10/1967 | Bies et al. | 406/138 |
| 3,416,844 | 12/1968 | Steidley | 406/152 |
| 3,870,375 | 3/1975 | Duncan et al. | 406/127 |

FOREIGN PATENT DOCUMENTS

| | | | |
|---|---|---|---|
| 207913 | 11/1955 | Australia | 406/93 |
| 762109 | 11/1956 | United Kingdom | 406/144 |

Primary Examiner—Jeffrey V. Nase
Attorney, Agent, or Firm—Wood, Herron & Evans

[57] ABSTRACT

An improved powder pump for pumping air entrained solid particulate powder material comprising a pneumatic conveyor line within which there is located a low pressure venturi pumping chamber. This venturi pumping chamber is intersected by a powder supply passage through which powder is drawn via a siphon tube into the conveyor line from a fluidized bed source of powder material. Over the inlet end of the siphon tube there is a cone shaped deflector plate which functions to reduce the inflow of air bubble created powder voids and consequent uneven flow of powder from the pump.

15 Claims, 5 Drawing Figures

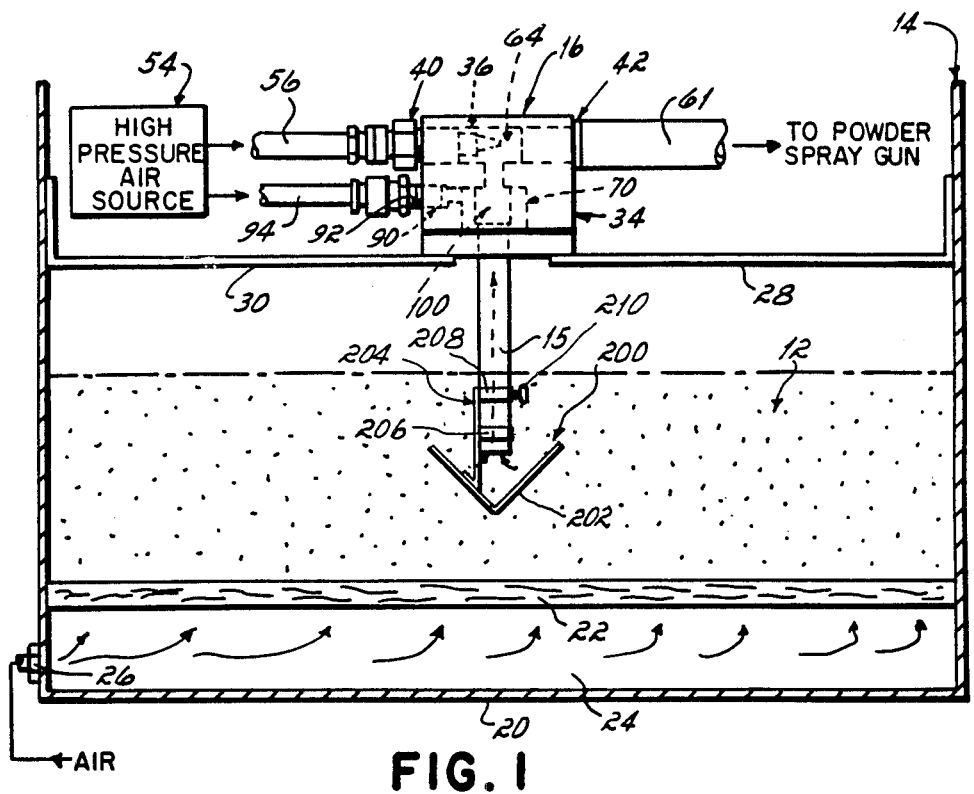
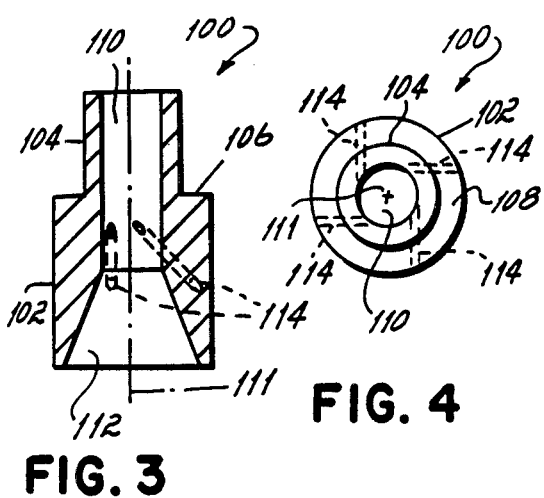
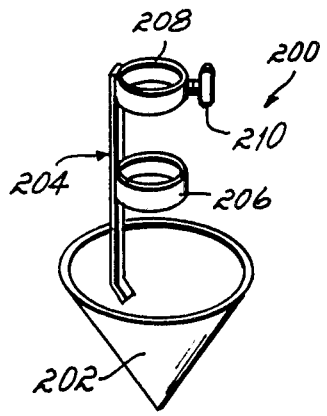
FIG. 1
FIG. 3
FIG. 4
FIG. 5

POWDER PUMP HAVING SUCTION TUBE DEFLECTOR

This application is a continuation-in-part of application Ser. No. 660,388, filed Oct. 12, 1984, now abandoned and entitled "Improved Venturi Powder Pump".

This invention relates to powder pumps for pumping solid particulate powder material to powder spray guns. More particularly, this invention relates to an improved powder pump for pumping an even flow of powder from a fluidized bed of powder to a powder spray gun or dispenser.

Characteristically, powder pumps comprise a pneumatic conveyor line within which there is a low pressure venturi pumping chamber. This chamber is intersected by a powder supply passage through which powder is supplied from a fluidized bed. In order to meter or control the rate of flow of powder from the powder source into the venturi pumping chamber, such pumps conventionally include a metering air flow passage operable to inject a controlled flow of air into the powder supply passage. The pressure of this metering air flow controls the amount of air which is mixed with the powder entering the pump. Consequently, if the metering air flow pressure is increased, the amount of air in the powder-air mixture is increased and therefore the net powder flow rate is decreased. Conversely, if the metering air flow pressure is decreased, the amount of air in the powder-air mixture is decreased and therefore the net flow rate of powder is increased. A typical prior art powder flow pump of this type is disclosed and described in U.S. Pat. No. 3,746,254 of Lane S. Duncan, et al, which patent is assigned to the assignee of this application, In the above identified U.S. Pat. No. 3,746,254, metering air flow into the powder supply passage to the powder pump is directed through an annular orifice radially and generally perpendicular to the powder flow passage. In other prior art powder pumps the metering air flow is directed radially into the powder flow passage through radial slots in a diffuser. In either event, the pressure of the metering air flow supplied to the powder supply passage controls the rate of flow of powder into the pump.

One of the shortcomings of all powder spray systems including systems incorporating powder pumps of the type described hereinabove is that the powder ejected from the spray gun of the system commonly flows unevenly from the gun. There are periodic puffs or clouds of powder ejected from the gun and periodic reductions in the density of powder ejected from the gun. Such periodic increases or decreases in powder density result in uneven application of powder to a target substrate to which the powder is applied. Consequently, such random changes in powder density are very undesirable.

There have been numerous attempts to minimize or reduce these random changes of powder density sprayed from a powder spray gun. Such attempts have taken the form of changes in the design of the powder spray gun, changes in the design and configuration or length of hose between the powder pump and the gun, etc. Most of these changes have improved the situation somewhat, but have not cured the problem.

It has been an objective of this invention to provide an improved powder spray system wherein inadvertent or random changes in the flow rate of powder dispensed from a powder spray gun or dispenser of the system are substantially reduced or minimized.

This invention is in part predicated upon the discovery that one source of uneven flow of powder from a powder spray gun or dispenser of a powder spray system occurs in the siphon tube through which powder is drawn into the powder pump from a fluidized bed of powder. I have found that periodic powder voids or air bubbles pass through this siphon tube and that these voids in turn result in corresponding downstream changes of powder flow from the pump. It has therefore been another objective of this invention to eliminate or minimize powder voids or air bubbles being drawn into a powder pump siphon tube from a fluidized bed of powder.

These objectives are achieved and this invention is predicated upon the concept of locating a deflector over the siphon tube inlet of a powder pump. This deflector has the effect of materially reducing or substantially eliminating intake of powder voids or air bubbles into a powder pump from a fluidized bed source of powder. The result is a more even flow of powder from the powder pump.

The improved powder pump of this invention comprises a conventional pneumatic conveyor line pump having a venturi pumping chamber contained therein. This pumping chamber is intersected by a powder supply passage to which powder is supplied by a siphon tube from a fluidized bed of powder. The siphone tube has a deflector in the form of an inverted cone over its inlet but spaced therefrom so as to force fluidized powder to flow through a circuitous flow path before entering the tube. The effect of this deflector over the siphon tube inlet is to substantially reduce or very nearly eliminate the intake of powder voids or air bubbles into the siphon tube. This results in a much more even or consistent flow of powder from the powder pump.

These and other objects and advantages of this invention will be more readily apparent from the following description of the drawings in which:

FIG. 1 is a side elevational view, partially in cross section, of a powder spray system incorporating the novel powder pump of this invention.

FIG. 3 is an enlarged cross-sectional view of the diffuser of the powder pump of FIG. 1.

FIG. 4 is a top plan view of the diffuser of FIG. 3.

FIG. 5 is a perspective view of the deflector utilized in the powder pump of FIG. 1.

Figure 2:
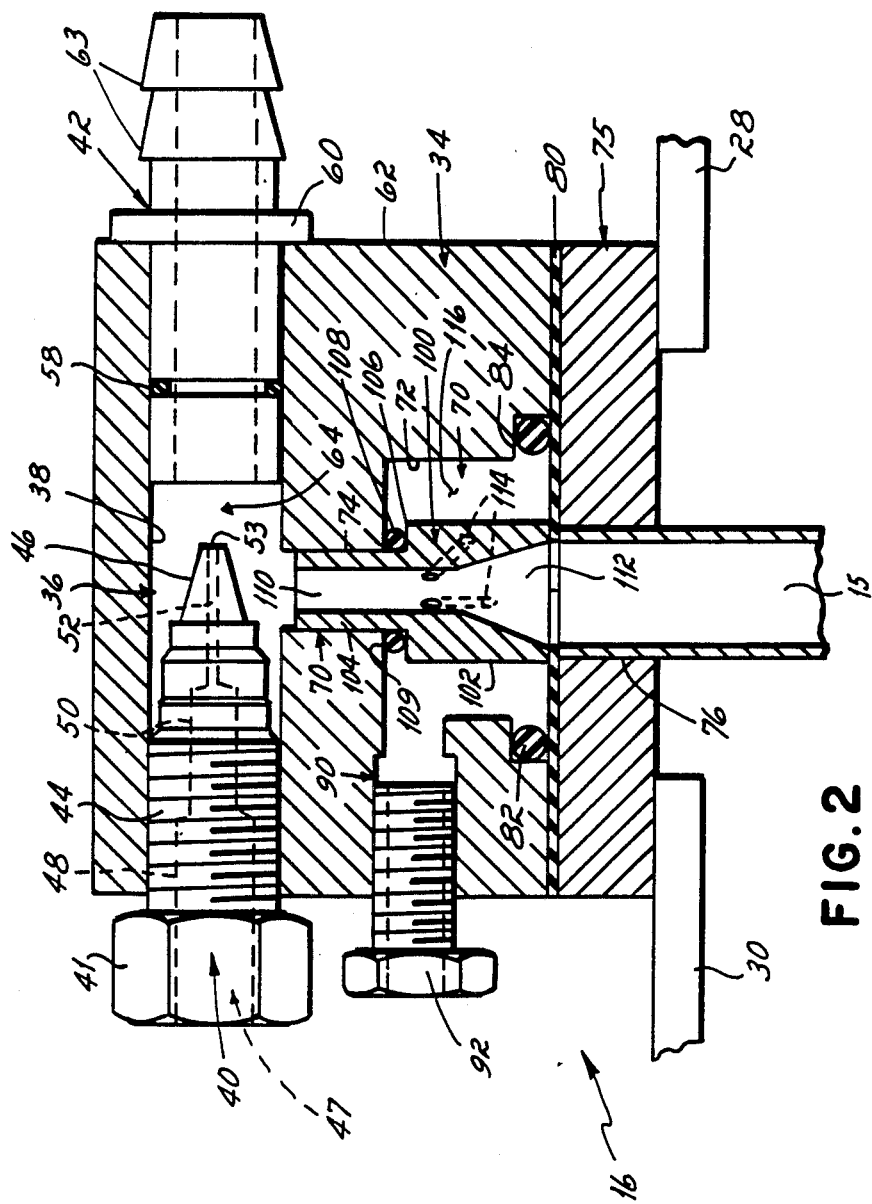
FIG. 2 is a cross-sectional view through the powder pump of FIG. 1.

Referring first to FIG. 1, there is illustrated a powder spray system for transporting solid particulate powder 12 from a fluidized bed container 14 through a powder pump 16 to a powder spray gun (not shown). The fluidized bed container 14 comprises a conventional open top container having four side walls and a bottom wall 20. Spaced upwardly from the bottom wall there is an air pervious wall 22 which extends between the four side walls and is secured thereto. This air pervious wall, the parallel bottom wall 20, and the side walls define an air chamber 24 into which high pressure air is introduced from a source (not shown) through a side wall fitting 26. This high pressure air passes from the air chamber 24 upwardly through the pervious wall 22 to fluidize the powder 12 contained interiorly of the container 14. Container 14 generally includes a cover member (not shown) and a air vent (not shown) in the cover member to vent the air out of container 14 after it passes upward through the powder.

The powder pump 16 ia mounted within the container by a pair of suppot brackets 28, 30. A siphon tube or conduit 15 extends downwardly from the pump into the container 14 and is operative to supply powder from the bed of fluidized powder 12 to the interior of the pump, as explained more fully hereinafter.

With reference now to FIG. 2, it will be seen that the powder pump 16 comprises a pump body 34 within which there is a pneumatic conveyor line 36. This conveyor line comprises a transverse bore 38 within which there is mounted an inlet nozzle 40 and an outlet fitting 42. Between the inlet nozzle 40 and outlet fitting 42, there is a low pressure venturi pumping chamber 64.

The nozzle 40 has a hex head 41 at one end located externally of the pump body 34, and a generally tubular shaped section 44 which extends inwardly from the hex head to a conically shaped discharge end 46 of the nozzle. The discharge end 46 of the nozzle is located within the venturi pumping chamber 64 of the pump. The nozzle 40 is mounted within the bore 38 by external threads of the nozzle being threaded into a matingly threaded section of the bore 38. Internally of the nozzle 40, there is an axial bore 47 which extends from a large diameter outer end section 48, through a smaller diameter middle section 50, to a very small diameter discharge end section 52. The small diameter discharge end section 52 of the nozzle bore terminates in a discharge orifice 53 through which high velocity air is supplied to the interior of the pump. A high pressure source of air is connected via a conduit 56 to the inlet end 48 of the nozzle bore 47.

The outlet fitting 42 is mounted in the discharge end of the transverse bore 38. It comprises a conventional hose fitting sealingly secured within the transverse bore 38. An O-ring 58 is mounted on the periphery of the fitting so as to form a seal between the fitting and the bore 38. The fitting has a flange 60 which engages an end wall 62 of the pump body 34. Outwardly of the flange, the outlet fitting has tapered annual ribs 63 adapted to receive a discharge hose or conduit 61 through which powder is transported from the pump to a powder spray gun, or other powder dispenser.

In practice, high pressure air from the source 54 is directed through the nozzle 40 into the venturi pumping chamber 14 and subsequently through the outlet fitting 42. In the course of passage through the pneumatic conveyor line 38, the air flow lowers the pressure within the venturi pumping chamber 64 of the pneumatic conveyor line. As explained more fully hereinafter, the low air pressure in the venturi pumping chamber 64, functions to draw powder into the chamber.

Intersecting the transverse bore 38 there is a powder flow passage 70 which extends upwardly from the bottom of the pump body 34. This passage comprises a large diameter lower end section 72 and a smaller diameter upper end section 74. The bottom of the pump body 34 rests atop a support block 75 which in turn is supported from the brackets 28, 30. The support block has a bore 76 coaxially aligned with the axis of the powder flow passage 70. The hose or conduit 15 is fitted into the bore 76 and forms a continuation of it downwardly into the fluidized powder 12.

The supporting block 75 is preferably bolted to the underside of the pump body 34 by bolts (not shown). A seal or gasket 80 is sandwiched between the support block 75 and the pump body 34. Additionally, an O-ring 82 is located within an annular groove 84 formed in the bore 72 of the pump body.

The powder flow passage 70 is intersected by a metering air flow passage 90. This passage is threaded and receives an inlet air fitting 92. High pressure air from the source 54 is supplied to the inlet air fitting 92 via a hose or conduit 94. As explained more fully hereinafter, high pressure air supplied through the metering air flow passage 90 into the powder flow passage controls the amount of air mixed with the powder flowing to the venturi pumping chamber of the pump. As the pressure in the line 90 is increased, the flow of powder from the bed 12 into the venturi pumping chamber is decreased as a consequence of additional air being added in relation to the powder. Correspondingly, as the pressure in line 90 is decreased, powder flow is increased in that there is proportionately more powder in the air-powder flow.

Contained internally of the powder flow passage 70 there is a powder diffuser 100. This diffuser is generally tubular in configuration and comprises a large diameter lower end section 102 and a smaller diameter upper end section 104. Between the two sections 102, 104 there is a shoulder 106.

The external diameter of the upper end section 104 of the diffuser is approximately the same diameter as the bore 74 in the upper end of the powder flow passage 70 and is mounted therein. An O-ring seal 108 surrounds the upper end of the diffuser 104 and is sandwiched between the shoulder 106 of the diffuser and a shoulder 109 of the powder flow passage 70. This O-ring is resilient and spring biases diffuser 102 downwardly as viewed in FIG. 2 to insure that the bottom of the diffuser is sealed against the gasket 80. Alternatively, the diffuser may be sized so as to bear against the gasket 80 or may be threaded with the bore 74 so as to achieve the same seal between the bottom of the diffuser and the gasket 80. The diffuser 100 has an axial bore 110 extending therethrough. The lower end of this bore 110 tapers outwardly to form an entrance throat 112 for powder entering the diffuser from the fluidized bed of powder 12 via the hose or conduit 15.

The diffuser 100 has angled ports 114 which extend generally at approximately a 45° angle to the axis 111 of the diffuser for injecting metering air flow into the diffuser (see FIG. 3). The bottom of the diffuser is closed by the support block 75 so that the only metering air flow which may enter the powder flow passage of the diffuser is through the ports 114 which extend between the annular air chamber 116 surrounding the diffuser 100 and the internal bore 110 of the diffuser.

With reference to FIG. 4, it will be seen that there are four such ports 114, all of which extend upwardly from the exterior to the interior of the diffuser at an angle of approximately 45° to the axis 111 of the diffuser, and each one of which intersects the internal bore 110 of the diffuser tangentially of the bore. Consequently, metering air flow entering the bore of the diffuser is caused to whirl upwardly thereby assisting in the transport of fluidized powder from the fluidized bed of powder 12 upwardly into the low pressure venturi pumping chamber 64.

With reference to FIGS. 1 and 5, it will be seen that there is suspended from the underside of the siphon tube or conduit 15, a deflector 200. This deflector comprises an inverted cone shaped plate 202 having a base diameter approximately three times the diameter of the siphon tube 15. A mounting bracket 204 extends upwardly from the plate 202. The lower end of this bracket 204 is welded or otherwise secured to the upper inside surface of the plate 202. At its upper end, the mounting bracket 204 has a pair of spaced mounting rings 206, 208 extending therefrom and adapted to be received over the lower end of the siphon tube 15. The uppermost one of these rings 208 has a set screw 210 extending therethrough, and adapted when threaded into the mounting ring, to frictionally engage the peripheral surface of the siphon tube 15 so as to secure the deflector 200 to the tube.

With reference to FIG. 1, it will be seen that the lower inside surface of the deflector 200 is spaced from the lower end of the siphon tube or hose 15 so that there is an air flow path between the upper surface of the deflector and the lower end of the tube 15. Fluidized powder contained within the fluidized bed 12 is free to flow around the deflector through the gap between the inside surface of the deflector plate 202 and the lower end of the tube 15 into the tube 15 and subsequently through the diffuser 100 into the powder pump.

In operation, high pressure air is supplied from a high pressure air source 54 into the pneumatic conveyor line 36 via the conduit 56. This high pressure air passes through the inlet nozzle 40, out the small diameter outlet orifice 53 thereof, and into the venturi pumping chamber 64 of the pneumatic conveyor line 36. From this venturi pumping chamber the air flows out of the pump via the outlet fitting 42 and a hose 61 to a powder spray gun. The low pressure created within the venturi pumping chamber results in powder being drawn upwardly from the fluidized bed of powder 12, around the deflector, through the siphon tube 15, through the diffuser 100 and powder flow passage 110 contained therein, and into the venturi pumping chamber 64. The greater the air pressure supplied to the nozzle 40, the greater is the quantity of powder drawn up from the fluidized bed into the pump. The quantity of powder air mixture which is supplied to the venturi chamber of the pump is regulated by metering air flow supplied to the pump from a high pressure air source via the conduit 94 and the metering inlet air flow passage 90. This metering air flow enters an annular chamber 116 surrounding the diffuser 100 and passes through the upwardly directed ports 114 into the powder flow passage of the diffuser 100. This upwardly directed air enters the powder flow passage 110 of the diffuser in an upwardly and tangential direction relative to that passage 110 so as to assist in transporting the powder upwardly into the venturi pumping chamber 64 from which the air entrained powder flows out of the pump via the outlet fitting 42 and conduit 64.

I have found that the placement of the deflector 200 over the inlet end of the siphon tube 15 has the effect of substantially reducing or eliminating powder voids or air bubbles being pulled into the siphon tube 15 such as commonly occurs in the absence of the deflector over the end of the tube 15. It results in a much more even flow of powder from the pump to a powder spray gun. Such even flow is, of course, very desirable in order to apply an even coating of powder to a target substrate located forwardly of the discharge end of a conventional powder spray gun.

While I have described only a single preferred embodiment of my invention, persons skilled in the art will appreciate changes and modifications which may be made without departing from the spirit of my invention. Therefore, I do not intend to be limited except by the scope of the following appended claims.

I claim:

1. Powder dispensing apparatus comprising:
- a vessel,
- means contained within said vessel for creating a fluidized bed of powder within said vessel,
- means for pumping an even flow of powder to a powder spray gun from said fluidized bed of powder, which pumping means comprises,
- a pneumatic conveyor line having an inlet end and a discharge end, said line also having a low pressure venturi pumping chamber contained therein,
- said discharge end of said conveyor line being adapted to be placed in fluid communication with a powder spray gun,
- said inlet end of said pneumatic conveyor line being adapted to be placed in fluid communication with a source of high pressure air,
- a powder flow passage intersecting said venturi pumping chamber, said powder flow passage having an inlet,
- a siphon tube connected to said inlet of said powder flow passage, said siphon tube having an inlet located within said vessel and in fluid communication with said fluidized bed of powder contained within said vessel, and
- deflector means adjacent but spaced from said siphon tube inlet for reducing the inflow of air bubble created powder voids from said fluidized bed of powder into said siphon tube.

2. The powder pump of claim 1 wherein said deflector means comprises a deflector plate located over but spaced from said siphon tube inlet.

3. The powder pump of claim 2 wherein said deflector plate is shaped as an inverted cone placed over but spaced from the inlet of said siphon tube, said cone shaped plate having a base diameter substantially larger than said inlet of said siphon tube.

4. The powder pump of claim 2 wherein said deflector plate has a mounting bracket secured thereto, said mounting bracket including at last one mounting ring located over and secured to said siphon tube.

5. Powder dispensing apparatus comprising:
- a vessel,
- means contained within said vessel for creating a fluidized bed of powder within said vessel,
- means for pumping an even flow of powder to a powder spray gun from said fluidized bed of powder, which pumping means comprises,
- a pneumatic conveyor line having an inlet end and a discharge end, said line also having a low pressure venturi pumping chamber contained therein,
- said discharge end of said conveyor line being adapted to be placed in fluid communication with a powder spray gun,
- said inlet end of said pneumatic conveyor line being adapted to be placed in fluid communication with a source of high pressure air,
- a powder flow passage intersecting said venturi pumping chamber, said powder flow passage having an inlet,
- a siphon tube connected to said inlet of said powder flow passage, said siphon tube having an inlet located within said vessel and in fluid communication with said fluidized bed of solid powder contained within said vessel, metering means for controlling the quantity of air mixed with said solid particulate powder which flows through said powder flow passage, said metering means comprising a metering air flow passage intersecting said powder flow passage at a location spaced from said venturi pumping chamber, said metering air flow passage having an inlet adapted to be placed in fluid communication with a source of high pressure air, and deflector means located adjacent but spaced from said siphon tube inlet for reducing the inflow of air bubble created powder voids from said fluidized bed of powder into said siphon tube.

6. The powder pump of claim 5 wherein said deflector means comprises a deflector plate located over but spaced from said siphon tube inlet.

7. The powder pump of claim 6 wherein said deflector plate is shaped as an inverted cone placed over but spaced from the inlet of said siphon tube, said cone shaped plate having a base diameter substantially larger than said inlet of said siphon tube.

8. The powder pump of claim 6 wherein said deflector plate has a mounting bracket secured thereto, said mounting bracket including at last one mounting ring located over and secured to said siphon tube.

9. The powder pump of claim 5 in which said metering air flow passage is operative to direct metering air flow into said powder flow passage through at least one port angled in the direction of powder flow through said powder flow passage.

10. The powder pump of claim 9 wherein said powder flow passage is circular in cross-section and said port is operative to direct said metering air flow tangentially into said powder flow passage.

11. The powder pump of claim 9 wherein said powder flow passage has an air flow diffuser mounted therein, said diffuser having an axial bore extending therethrough, said bore having an inlet end and a discharge end, and said metering air flow port being located within said diffuser and directed at an acute angle to the axis of said diffuser bore.

12. The powder pump of claim 11 wherein said axial bore of said diffuser is circular in cross-section and said port intersects said bore tangentially of said bore.

13. The powder pump of claim 12 wherein said deflector means comprises a deflector plate located over but spaced from said siphon tube inlet.

14. The powder pump of claim 13 wherein said deflector plate is shaped as an inverted cone placed over but spaced from the inlet of said siphon tube, said cone-shaped plate having a base diameter substantially larger than said inlet of said siphon tube.

15. The powder pump of claim 14 wherein said deflector plate has a mounting bracket secured thereto, said mounting bracket including at least one mounting ring located over and secured to said siphon tube.

* * * * *